United States Patent
Matsuike

(10) Patent No.: US 9,886,085 B2
(45) Date of Patent: Feb. 6, 2018

(54) IMAGE PROCESSING APPARATUS, IMAGE PROCESSING METHOD, AND PROGRAM

(71) Applicant: Sony Interactive Entertainment Inc., Tokyo (JP)

(72) Inventor: Hiroshi Matsuike, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/280,316

(22) Filed: Sep. 29, 2016

(65) Prior Publication Data

US 2017/0115727 A1    Apr. 27, 2017

(30) Foreign Application Priority Data

Oct. 26, 2015  (JP) ................................. 2015-209834

(51) Int. Cl.
G06T 19/20 (2011.01)
G06F 3/01 (2006.01)
G06F 3/00 (2006.01)

(52) U.S. Cl.
CPC .............. *G06F 3/011* (2013.01); *G06F 3/005* (2013.01); *G06T 19/20* (2013.01); *G06T 2219/2004* (2013.01)

(58) Field of Classification Search
CPC ... G06F 3/00; G06F 3/01; G06F 3/005; G06F 3/011; G06T 19/20
See application file for complete search history.

(56) References Cited

U.S. PATENT DOCUMENTS 6,646,643 B2 * 11/2003 Templeman ............ G06F 3/012
345/473
8,773,466 B2 * 7/2014 Matsuda ................. G06F 3/011
345/633

FOREIGN PATENT DOCUMENTS

| JP | 2012-137989 A | 7/2012 |
| JP | 2012-5773 A | 12/2012 |
| JP | 2014-68689 A | 4/2014 |
| WO | WO 2014/156796 A1 | 10/2014 |

OTHER PUBLICATIONS

Japanese Office Action dated Jul. 18, 2017 from the Corresponding Japanese Patent Application No. 2015-209834.

* cited by examiner

*Primary Examiner* — Phi Hoang
(74) *Attorney, Agent, or Firm* — Katten Muchin Rosenman LLP

(57) ABSTRACT

Disclosed herein is an image processing apparatus including: a nearness computation block configured to compute a nearness between a representative position representative of a user and a position of an object; a movement determination block configured to determine a movement of the object in a virtual space with an accuracy corresponding to the computed nearness; and a drawing block configured to draw an image on the basis of the determined movement.

4 Claims, 8 Drawing Sheets

IMAGE PROCESSING APPARATUS, IMAGE PROCESSING METHOD, AND PROGRAM

BACKGROUND

The present disclosure relates to an image processing apparatus, an image processing method, and a program.

A technology is known in which, when a user enters a three-dimensional position by manipulating a controller or selects an object inside a virtual space to be manipulated, interaction between the manipulation by the user and the object inside the virtual space is realized.

SUMMARY

In order to enhance the reality of interaction, increase in the accuracy of the processing associated with interaction is possible. For example, varying the ratio between a manipulation amount and a movement inside a virtual space or the distance serving as the threshold for use in contact determination allows the enhancement in the reality of interaction and minute manipulations. On the other hand, simply increasing the accuracy forces the user to execute fine manipulations and the like, thereby making it possible that user-expected manipulations cannot be executed.

Therefore, the present disclosure addresses the above-identified and other problems associated with related-art methods and apparatuses, and it is desirable to provide a technology intended to establish both the enhanced processing accuracy and user manipulability.

According to one embodiment of the present disclosure, an image processing apparatus includes: a nearness computation block configured to compute a nearness between a representative position representative of a user and a position of an object; a movement determination block configured to determine a movement of the object in a virtual space with an accuracy corresponding to the computed nearness; and a drawing block configured to draw an image on the basis of the determined movement.

According to another embodiment of the present disclosure, an image processing method includes: computing a nearness between a representative position representative of a user and a position of an object; determining a movement of the object in a virtual space with an accuracy corresponding to the computed nearness; and drawing an image on the basis of the determined movement.

According to a further embodiment of the present disclosure, a program for a computer includes: by a nearness computation block, computing a nearness between a representative position representative of a user and a position of an object; by a movement determination block, determining a movement of the object in a virtual space with an accuracy corresponding to the computed nearness; and by a drawing block, drawing an image on the basis of the determined movement.

According to the embodiments of the present disclosure, the accuracy of processing is enhanced and an operation by a user is facilitated at the same time.

DETAILED DESCRIPTION OF THE PREFERRED EMBODIMENT

The technology disclosed herein will be described in further detail by way of one embodiment thereof with reference to the accompanying drawings. It should be noted that components having similar functions are denoted by the same reference symbols and the description thereof will be skipped.

Figure 1:
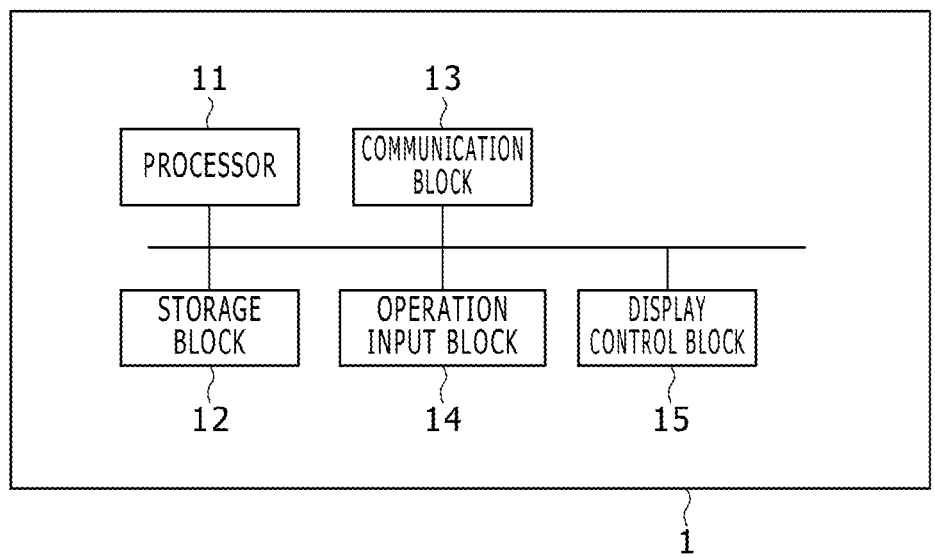
FIG. 1 is a diagram illustrating one example of a hardware configuration of an image processing apparatus according to one embodiment of the present disclosure.

Now, referring to FIG. 1, there is shown a diagram illustrating one example of a hardware configuration of an image processing apparatus 1 according to one embodiment of the present disclosure. The image processing apparatus 1 is a personal computer, a family game machine, or a portable information terminal. The image processing apparatus 1 has a processor 11, a storage block 12, a communication block 13, an operation input block 14, and a display control block 15.

The processor 11 operates as instructed by a program stored in the storage block 12, controlling the communication block 13, the operation input block 14, the display control block 15, and the like. It should be noted that the program mentioned above may be provided in a computer-readable storage medium such as a flash memory or provided via a network such as the Internet.

The storage block 12 includes a memory element such as a dynamic random access memory (DRAM) and a flash memory. The storage block 12 stores the program mentioned above. In addition, the storage block 12 stores information and computation results entered from the processor 11, the communication block 13, and the like.

The communication block 13 includes an integrated circuit, a connector, an antenna, and the like configuring a wired local area network (LAN) or a wireless LAN. The communication block 13 has a function of providing communication with other apparatuses via a network. Under the control of the processor 11, the communication block 13 enters information received from other apparatuses into the processor 11 or the storage block 12 and transmits information to other apparatuses.

The operation input block 14 is a circuit configured to obtain inputs from the hardware that detects operations done by a user. The operation input block 14 obtains inputs from a position input device through which positions for example are entered by the user and an input device such as a keyboard, thereby entering the detected information into the processor 11 or the storage block 12.

The display control block 15 includes a circuit configured to control a display output device such as a display. Under the control of the processor 11, the display control block 15 makes a display output device display images.

Figure 2:
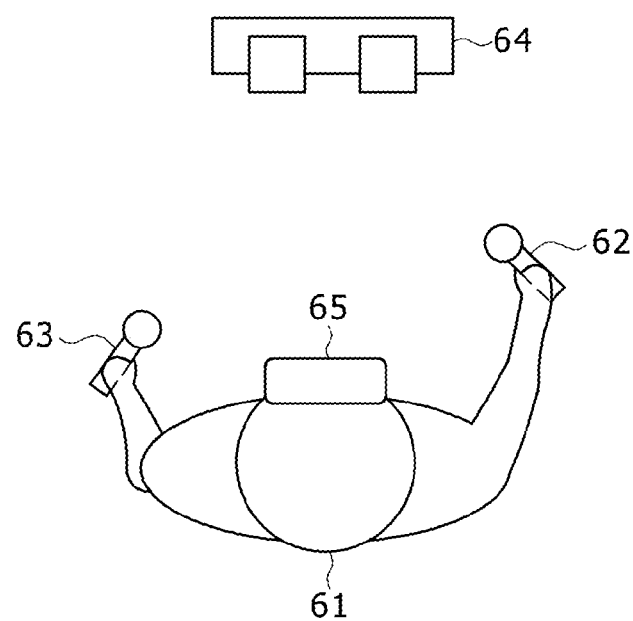
FIG. 2 is a diagram illustrating a method of using an input/output device when a user uses the image processing apparatus.

Referring to FIG. 2, there is shown one example of a method of using an input device or the like when a user 61 uses the image processing apparatus 1. In the example shown in FIG. 2, the user 61 is seen from above. In the present embodiment, motion controllers 62 and 63 and a camera 64 are used as input devices and a head-mounted display 65 is used as a display output device.

Each of the motion controller 62 and the motion controller 63 has a ball section for the camera 64 to recognize a position and a holding section to be grasped by the user 61. The holding section has a button. When the user 61 operates the button, the motion controller 62 or the motion controller 63 transmits information about the button operation to the operation input block 14 in a wireless manner and the operation input block 14 receives this information. The camera 64 takes images including the ball sections of the motion controller 62 and the motion controller 63 and, on the basis of the position and the size of a ball section within these taken images, detects a real specified position specified in a real space by the motion controller 62 or the motion controller 63. The operation input block 14 obtains the detected real specified position of the motion controller 62 or the motion controller 63.

The head-mounted display 65 is a display that is worn on the head of the user 61 so as to display an image just in front of the eyes of the user 61. If the displayed image is based on parallax, the user 61 is able to recognize an object included in the image in a cubic manner. The head-mounted display 65 can display an image that is high in presence for the user 61. If parallax is provided, the user 61 is able to correctly recognize the three-dimensional position of an object inside a virtual space, thereby allowing the user 61 to experience good interaction with an object inside a virtual space.

Figure 3:
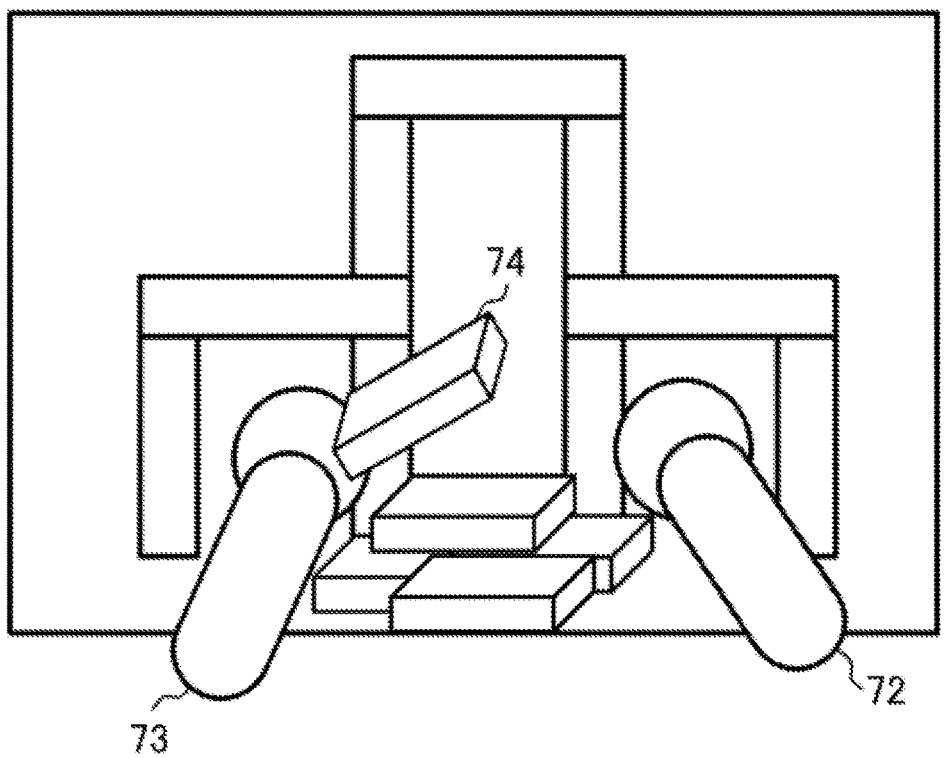
FIG. 3 is a diagram illustrating one example of an image to be displayed.

Referring to FIG. 3, there is shown one example of an image to be displayed. An image to be displayed in the present embodiment is a three-dimensional image relative to the direction of viewpoint at a position (hereafter referred to as "virtual representative position") of the user 61 inside a virtual space. With this image, specified objects 72 and 73 are displayed at positions (hereafter referred to as "virtual specified positions") inside a virtual space equivalent to the real specified positions indicated by the motion controllers 62 and 63. In addition, a manipulated object 74 that is manipulated by the specified object 73 is displayed. It should be noted that, if, by the operation of the motion controllers 62 and 63, a virtual representative position is moved, the direction of viewpoint of the user 61 inside a virtual space is changed, or the position or direction of an object inside a range in which an image is drawn inside a virtual space is changed, then the image processing apparatus 1 draws an image with these changes reflected and displays the drawn image onto a display output device such as the head-mounted display 65.

Figure 4:
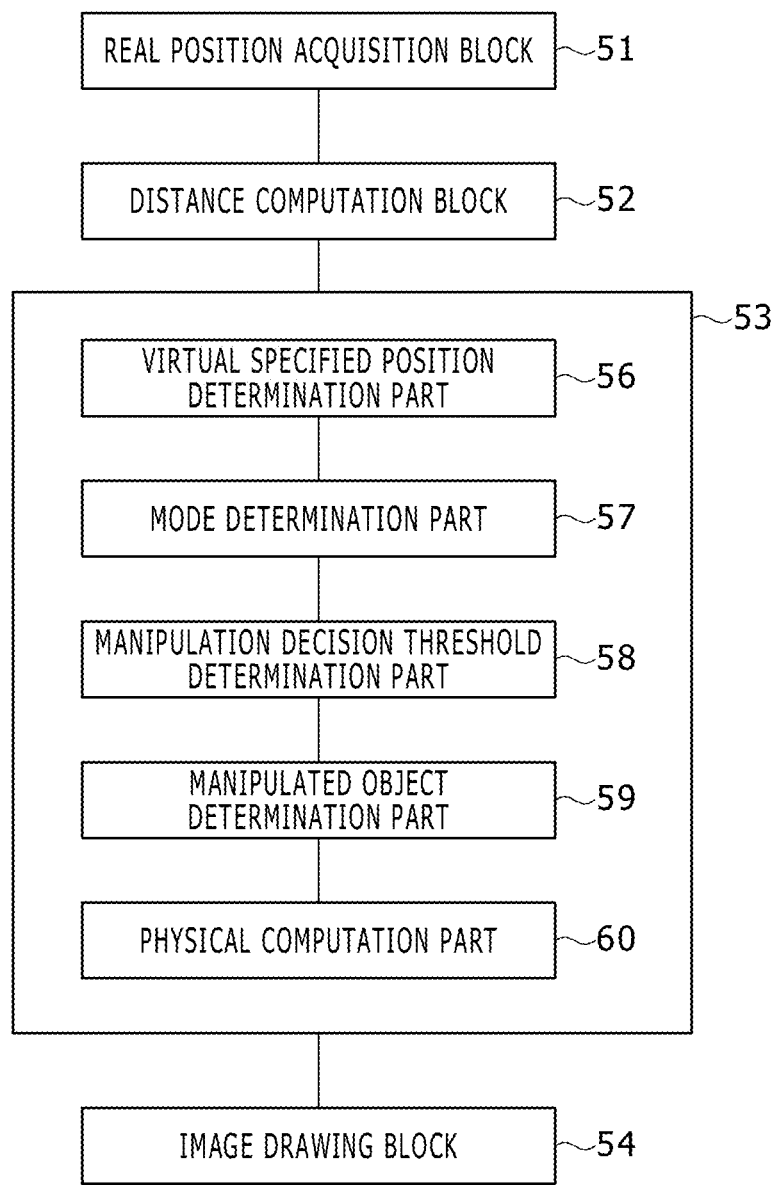
FIG. 4 is a block diagram illustrating functions that are realized by the image processing apparatus.

Referring to FIG. 4, there is shown a block diagram illustrating functions that are realized by the image processing apparatus 1 related with the present embodiment. The image processing apparatus 1 functionally includes a real position acquisition block 51, a distance computation block 52, an operation determination block 53, and an image drawing block 54. Further, the operation determination block 53 includes a virtual specified position determination part 56, a mode determination part 57, a manipulation decision threshold determination part 58, a manipulated object determination part 59, and a physical computation part 60.

The real position acquisition block 51 is realized by the processor 11 mainly by executing a program stored in the storage block 12, processing information from the operation input block 14 that obtains information from the motion controller 62 or 63 and the camera 64, and storing the results of the processing into the storage block 12. The distance computation block 52 and the operation determination block 53 are realized by the processor 11 mainly by executing a program stored in the storage block 12, processing the information stored in the storage block 12 and the like, and storing the results of the processing into the storage block 12. The image drawing block 54 is realized by the processor 11 mainly by executing a program stored in the storage block 12, processing the information stored in the storage block 12 and the like, and controlling the display control block 15 so as for a display output device to display an image.

The real position acquisition block 51 acquires a real specified position indicated by the user 61 in a real space. In addition, the real position acquisition block 51 acquires the position of the user 61 (referred to as "real representative position") in a real space. The real specified position and the real representative position acquired by the real position acquisition block 51 are positions in a three-dimensional space. In the present embodiment, the real specified position is the position of the ball section of the motion controller 62 or 63; however, this real specified position may be the position of the hand itself of the user 61. The real representative position may be the position of the head-mounted display 65 (a position equivalent to the viewpoint of the user 61) or such a position near the user 61 as a position a bit in front of the chest of the user 61.

The distance computation block 52 computes the nearness between the representative position representative of the user 61 and the position of an object. To be more specific, the distance computation block 52 computes the nearness between the real representative position of the user 61 and a real specified position and the nearness between a virtual representative position and the position of an object inside a virtual space. In the former, the object for use in computing nearness is an object for the user 61 to specify a position; for example, the motion controller 62 or 63 or the hand of the user 61.

The operation determination block 53 determines the movement of an object in a virtual space with an accuracy corresponding to the computed nearness. The movement of an object in a virtual space determined with the above-mentioned accuracy by the operation determination block 53 includes a movement of an object other than the user 61 arranged inside a virtual space and the movements of the specified objects 72 and 73 indicated by virtual specified positions.

Figure 5:
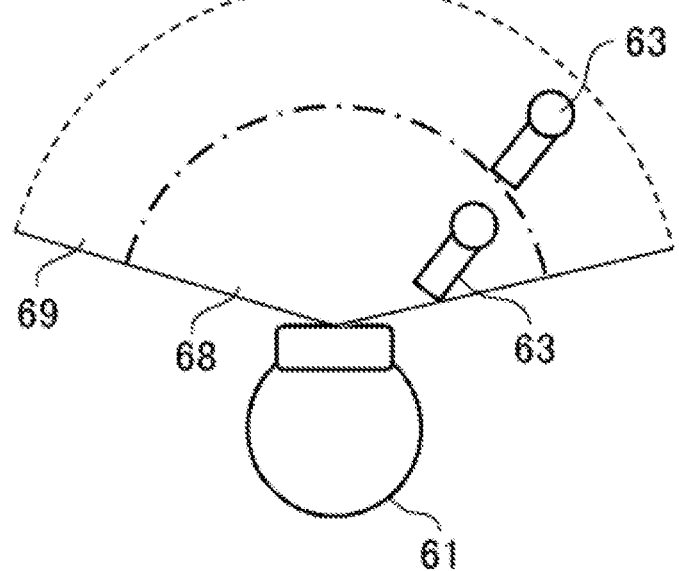
FIG. 5 is a diagram schematically illustrating a relation between a distance from a user and an accuracy.

Referring to FIG. 5, there is schematically shown a relation between the distance from the user 61 and the accuracy. For example, in FIG. 5, the operation determination block 53 determines the movement of an object such that, in a high accuracy area 68 that is an area (an area nearer to the user 61 than a dash-dot line) smaller in distance than a predetermined value, the accuracy of the movement of the object is higher than that in a low accuracy area 69 larger in distance than this predetermined value. Also, if the motion controller 63 is found in the high accuracy area 68, for example, the operation determination block 53 obtains a virtual specified position with a higher accuracy than in the case where the motion controller 63 is found in the low accuracy area 69.

The image drawing block 54 draws a three-dimensional image of an object in a virtual space on the basis of the determined movement of the object. In a virtual space, the image drawing block 54 draws an image in the case where the direction of viewpoint of the user 61 is seen from a virtual representative position.

The virtual specified position determination part 56 determines the movement of a virtual specified position on the basis of the nearness between a real representative position and a real specified position and the real specified position.

The mode determination part 57 determines on the basis of a manipulation done by the user 61 whether the current mode is an interaction mode or not. In the interaction mode, the manipulated object 74 in a virtual space may be manipulated by moving a real specified position by the user 61.

The manipulation decision threshold determination part 58 determines a decision threshold on the basis of the nearness between a representative position and the position of an object. This decision threshold is used to determine whether an object found inside a virtual space is the manipulated object 74 to be manipulated. The nearness between a representative position and the position of an object which nearness is used by the manipulation decision threshold determination part 58 may be the nearness between a virtual representative position and a virtual specified position or may be the nearness between a virtual representative position and the position of an object other than the specified objects 72 and 73 inside a virtual space.

The manipulated object determination part 59 detects the manipulated object 74 on the basis of the decision threshold determined above. To be more specific, from among two or more objects other than the specified objects 72 and 73 and the user 61 inside a virtual space, the manipulated object determination part 59 detects an object smaller in the distance from a virtual specified position than the decision threshold as the manipulated object 74.

The physical computation part 60 computes the movements of two or more objects such that the movements of the two or more objects including the manipulated object 74 follow physical laws in a virtual space. It should be noted that the physical computation part 60 may compute the movements of the two or more objects with an accuracy corresponding to the nearness between each of the two or more objects and a virtual representative position.

Figure 6:
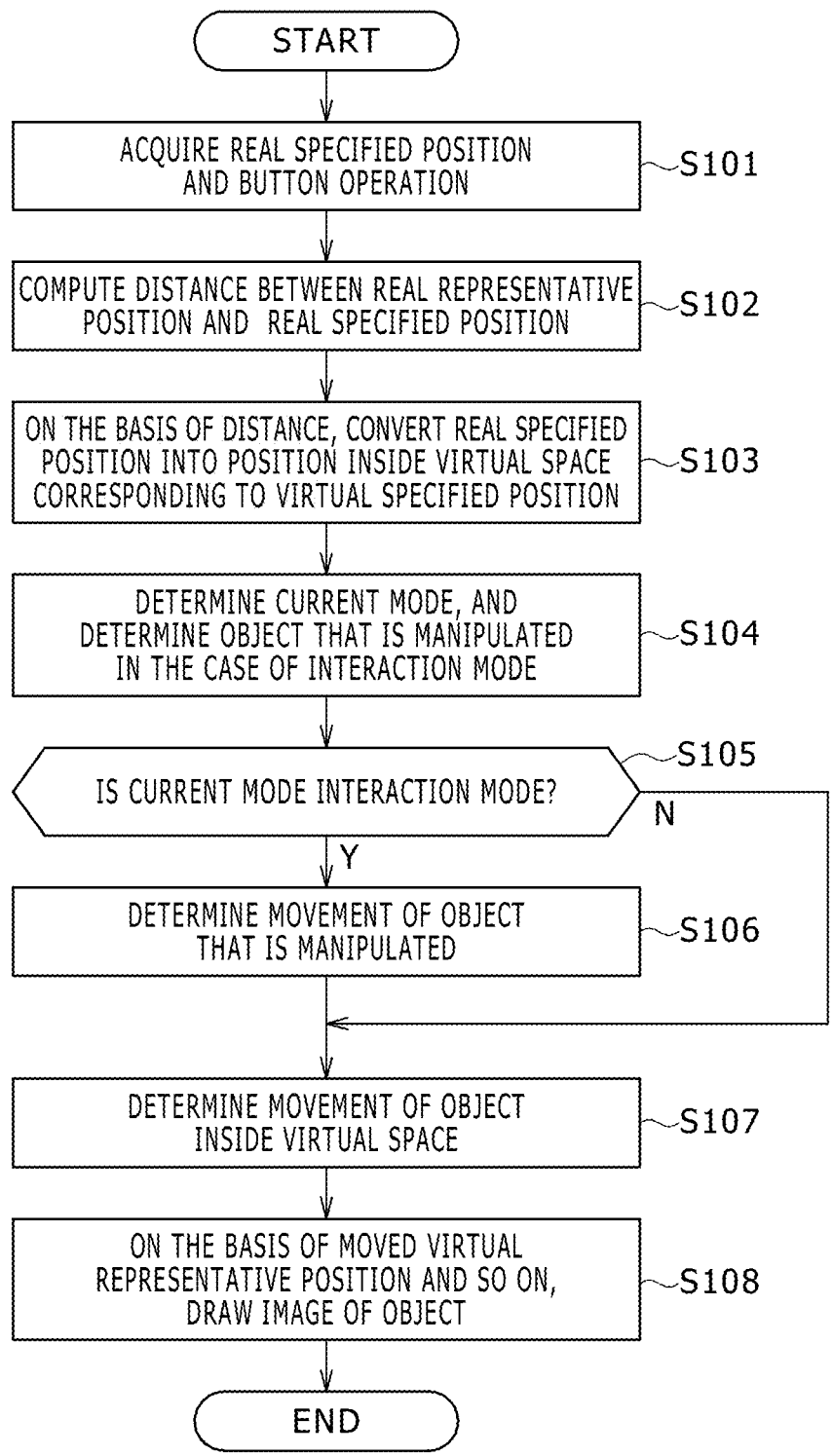
FIG. 6 is a diagram illustrating one example of a processing flow of the image processing apparatus.

Referring to FIG. 6, there is shown a diagram illustrating one example of a processing flow of the image processing apparatus 1. First, the real position acquisition block 51 acquires a real specified position and a button operation (step S101). The real position acquisition block 51 detects, as this button operation, whether the button is being pressed at the current point of time, the button has been newly pressed, and the pressed button has been released. In addition, the real position acquisition block 51 acquires a current real specified position and a real representative position that is representative of the user 61.

Next, the distance computation block 52 computes a distance between the real representative position of the user 61 and the real specified position (step S102). The distance computation block 52 may obtain a three-dimensional distance between the real representative position and the real specified position as the nearness between the real representative position of the user 61 and the real specified position or a two-dimensional distance only by using a horizontal component of the real representative position and the real specified position.

On the basis of the computed distance between the real representative position and the real specified position, the virtual specified position determination part 56 converts the real specified position into a position inside a virtual space corresponding to a virtual specified position (step S103). In addition, on the basis of the virtual specified position at the current point of time and the converted position inside a virtual space, the virtual specified position determination part 56 determines a moving speed and a rotational speed of the virtual specified position. If there is no collision or the like between an object inside the virtual space and the specified objects 72 and 73, then the virtual specified position moved by the determined moving speed and the converted position inside a virtual space are the same. To be more specific, if there is no collision or the like, the virtual specified position determination part 56 determines the movement of a virtual specified position such that a ratio of a distance between a virtual representative position and a virtual specified position to a distance between a real representative position and a real specified position gets larger as the real representative position is nearer to the real specified position. From a different point of view, the virtual specified position determination part 56 determines the movement of a virtual specified position such that a ratio of the amount of movement of the virtual specified position to the amount of movement of the real specified position gets larger as a real representative position is nearer to a real specified position.

Figure 7:
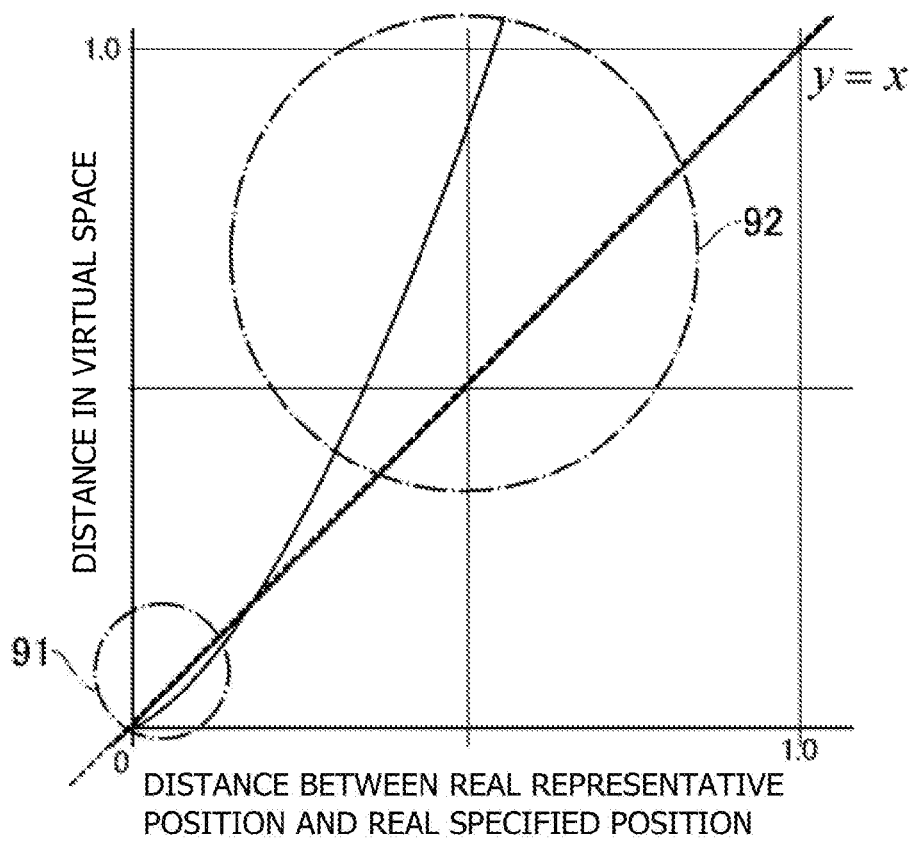
FIG. 7 is a diagram illustrating a relation between a distance from a user in a real space and a distance in a virtual space.

Referring to FIG. 7, there is shown a diagram illustrating a relation between a distance from the user 61 in a real space and a distance in a virtual space. With the graph shown in FIG. 7, the horizontal axis (the x axis) is indicative of a distance (a real distance) between a real representative position and a real specified position and the vertical axis (the y axis) is indicative of a distance (a virtual distance) between a virtual representative position and a virtual specified position in a virtual space. The solid line in the graph is indicative of a relation between a real distance and a virtual distance, the relation being indicated by a polynomial function such as a 1.5-degree function for example. The dashed line in the graph is indicative of a related-art relation between a real distance and a virtual distance in the case where the real distance is equal to the virtual distance in order to make comparison with the solid line. In accordance with the relation shown in FIG. 7, the virtual specified position determination part 56 converts the real distance into the virtual distance, thereby computing a virtual specified position on the basis of a direction in the real space, a virtual distance, and the representative position and viewpoint direction of the user 61 in the virtual space. For example, in an area 91, the virtual distance in a virtual space is smaller than the real distance indicated by the user 61, so that the movements of such objects as the specified objects 72 and 73 are determined with an accuracy higher than that provided by related-art techniques. On the other hand, in an area 92, a virtual distance inside the virtual space is larger than the real distance indicated by the user 61, so that the movements of such objects as the specified objects 72 and 73 are determined with an accuracy lower than that provided by related-art techniques.

Figure 8:
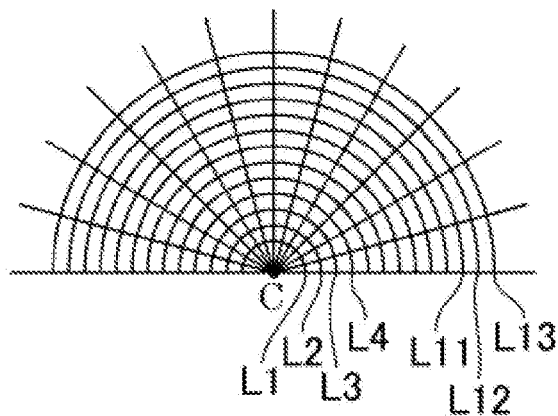
FIG. 8 is a diagram illustrating a relation between a distance and a position in a real space.
Figure 9:
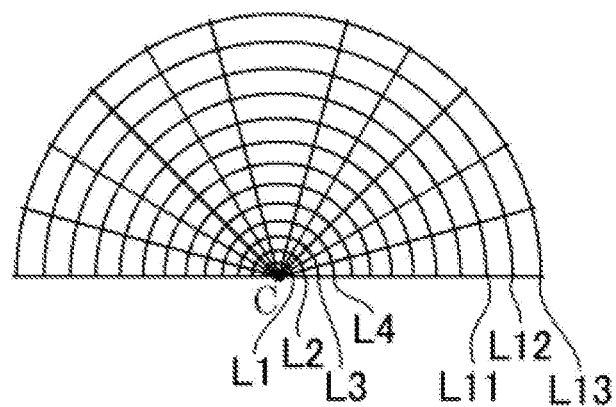
FIG. 9 is a diagram illustrating a relation between a position in a virtual space and a distance in a real space.

Referring to FIG. 8, there is shown a diagram illustrating a relation between distances and positions in a real space. Referring to FIG. 9, there is shown a diagram illustrating a relation between positions in a virtual space and distances in a real space. FIG. 8 shows arcs L1 through L13 in an ascending order of distances from a representative position C. The arcs L1 through L13 are each a curve connecting the points at which distances from the representative position C are equal to each other. An interval between two adjacent arcs of the arcs L1 through L13 is constant in a real space. On the other hand, in the virtual space shown in FIG. 9, the arcs L1 through L13 are written at the positions corresponding to the arcs L1 through L13 in the real space shown by FIG. 8. In FIG. 9, for two adjacent arcs of the arcs L1 through L13, the interval between the two adjacent arcs gets smaller as these two arcs get nearer to the representative position C and larger as these two arcs get farther from the representative position C. Therefore, the nearer to the representative position C, the change of a virtual specified position for the movement of the real specified position gets smaller, thereby determining the virtual specified position with a higher accuracy. Consequently, the movement of objects (the specified objects 72 and 73 and the manipulated object 74, for example) inside a virtual space associated with the virtual specified position is determined in accordance with the distance from the representative position C.

Next, on the basis of a button operation by the user 61 and a real specified position, the mode determination part 57 determines a current mode and, if an interaction mode is determined, the manipulated object determination part 59 determines the manipulated object 74 (step S104). To be more specific, on the basis of a decision threshold determined by the manipulation decision threshold determination part 58, the mode determination part 57 determines whether the current operation mode is the interaction mode or not. A decision threshold is determined on the basis of the nearness between the virtual representative position and the virtual specified position obtained by the distance computation block 52. In addition, if the interaction mode is determined, the manipulated object determination part 59 selects the manipulated object 74 from among two or more objects found inside a virtual space.

Figure 10:
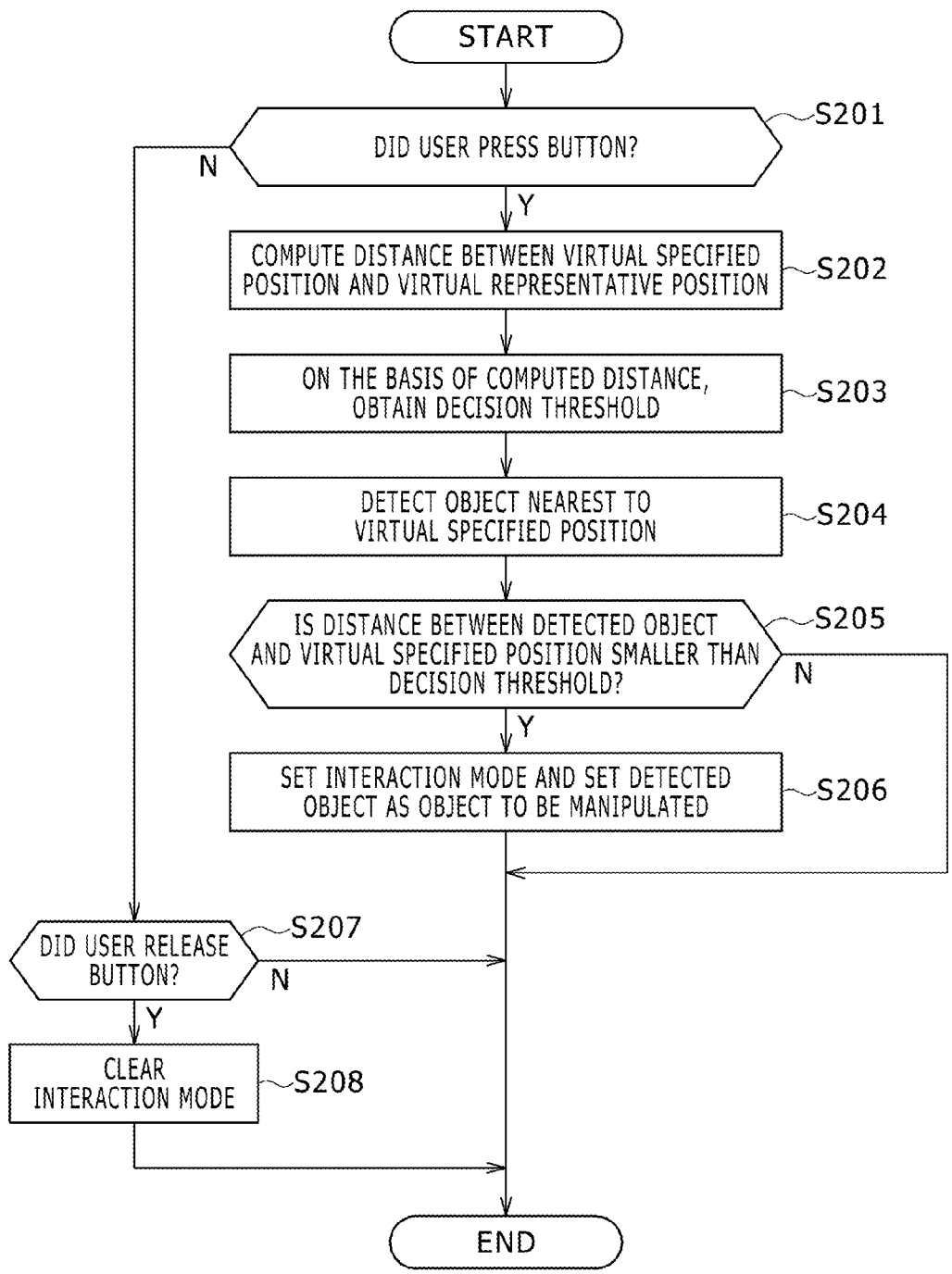
FIG. 10 is a diagram illustrating one example of a processing flow related with a mode determination part, a manipulation decision threshold determination part, and a manipulated object determination part.

The following further describes the processing of step S104. Referring to FIG. 10, there is shown a diagram illustrating one example of a processing flow associated with the mode determination part 57, the manipulation decision threshold determination part 58, and the manipulated object determination part 59. First, on the basis of inputs from the motion controllers 62 and 63, the mode determination part 57 detects whether a button included in any one of the motion controllers 62 and 63 has been newly pressed by the user 61 (step S201). If a button is found newly pressed (Y of step S201), then the distance computation block 52 computes a three-dimensional or horizontal distance between a virtual representative position and a virtual specified position (step S202). Here, of the motion controllers 62 and 63, the one for which the button has been pressed is referred to as a target controller. Then, on the basis of the computed distance between the virtual specified position and virtual representative position, the manipulation decision threshold determination part 58 obtains a decision threshold (step S203). To be more specific, the manipulation decision threshold determination part 58 obtains a decision threshold such that the decision threshold gets larger as the computed distance is larger. For example, if the computed distance is smaller than a certain constant value, then the manipulation decision threshold determination part 58 may determine a first value as a decision threshold and, if the computed distance is larger than the certain constant value, may determine a second value larger than the first value as a decision threshold. In addition, the manipulation decision threshold determination part 58 may compute a decision threshold by a function that monotonously increases for the computed distance.

When a decision threshold has been obtained, the manipulated object determination part 59 computes distances between a virtual specified position indicated by the target controller for which the button has been pressed and each of two or more objects, thereby detecting the object nearest to this virtual specified position (step S204). Next, the manipulated object determination part 59 determines whether the distance between the detected object and the virtual specified position is smaller than the decision threshold (step S205). If the distance between the detected object and the virtual specified position is found smaller than the decision threshold (Y of step S205), then the mode determination part 57 sets the current mode to the interaction mode and the manipulated object determination part 59 sets the detected object as the manipulated object 74 (step S206), and the mode determination part 57 stores in the storage block 12 the information indicative of the target controller for which the button was pressed as target controller information. On the other hand, if the distance between the detected object and the virtual specified position is found larger than the decision threshold (N of step S205), it indicates that there is no manipulated object 74, so that step S206 is skipped.

Here, if the button was not newly pressed by the user 61 in step S201 (N of step S201) and the button for the target controller indicated by the target controller information was released by the user 61 (Y of step S207), then the mode determination part 57 sets the current mode to a mode other than the interaction mode, thereby clearing the interaction mode (step S208). On the other hand, if this button is kept pressed by the user 61 (N of step S207), then the mode determination part 57 does not change the operation mode.

When the processing of step S104 is executed, the physical computation part 60 determines, if the current mode is the interaction mode (step S105), the movement of the manipulated object 74 on the basis of the moving speed of the specified object 72 or 73 at the virtual specified position and a positional relation between this specified object 72 or 73 and the manipulated object 74 (step S106). For example, the physical computation part 60 may determine the movement of the manipulated object 74 such that the manipulated object 74 sucks the specified object 72 or 73 and the sucking position of the manipulated object 74 moves in the same manner as the specified object 72 or 73.

As seen from the description made above, a decision threshold is set on the basis of the distance between a virtual specified position and a virtual representative position and an object to be manipulated is determined by this decision threshold. For example, if a virtual specified position is near the user 61, then, as compared with the case where it is remote from the user 61, it is necessary to make the virtual specified position approach to an object at the time of manipulating the object. From a different point view, if a virtual specified position is near the user 61, then the possibility for an unintended object to become the manipulated object 74 gets lower, thereby enabling the decision of the movement of an object with a higher accuracy. On the other hand, if a virtual specified position is remote from the user 61, then the user 61 is able to determine the manipulated object 74 with a less clear operation at the cost of a lower accuracy. For example, the user 61 is able to also grasp an object at a position not reachable by the specified object 72 or 73. It should be noted that the interval between an object equivalent to a decision threshold and a virtual specified position is much smaller than the distance between a virtual representative position and a virtual specified position and therefore the position of the object to be manipulated is sufficiently near the virtual specified position. Therefore, it may be said that the operation of an object to be manipulated is determined on the basis of the nearness between the object to be manipulated and a virtual representative position.

Further, the physical computation part 60 determines movements of two or more objects inside a virtual space on the basis of movements of the determined specified objects 72 and 73, movements of the determined object to be manipulated, and predetermined movements of two or more objects (step S107). The movements of two or more objects to be determined are moving speed and rotational speed. The physical computation part 60 also computes the positions and angles of two or more objects in a frame to be next drawn by the image drawing block 54. The physical computation part 60 also determines the positions of the specified objects 72 and 73 to be drawn by the image drawing block 54, namely, virtual specified positions. Here, if the specified objects 72 and 73 collide with another object (an obstacle) when the specified objects 72 and 73 move at the moving speed and rotational speed determined by the virtual specified position determination part 56, the positions of the specified objects 72 and 73 to be computed by the physical computation part 60 are the positions at which the collision is taken into consideration such as positions at which the collision with this obstacle occurred. Therefore, the virtual specified position at the time of drawing by the image drawing block 54 is based on a position inside a virtual space obtained by converting a real specified position in the virtual specified position determination part 56 but does not necessarily match this position. Thus, determination of the positions of the specified objects 72 and 73 prevents the specified objects 72 and 73 from crushing into an obstacle, thereby allowing the realization of a natural interaction that does not give the sense of incongruity.

The physical computation part 60 obtains the speeds of two or more objects and, on the basis of the obtained speeds, executes collision decision. In addition, if there are constraint conditions on mutual positions and so on of two or more objects, the physical computation part 60 computes, by the processing of a constraint solver, the positions and so on that satisfy the constraint conditions for these two or more objects. The constraint solver computes the position and so on of each object that satisfy the constraint conditions by known iterative solutions such as an impulse method.

Upon determination of the movements of two or more objects, the image drawing block 54 draws the three-dimensional images of the objects on the basis of the determined positions and angles of the objects, the virtual representative position, and the direction of viewpoint (step S108).

The present disclosure contains subject matter related to that disclosed in Japanese Priority Patent Application JP 2015-209834 filed in the Japan Patent Office on Oct. 26, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a nearness computation block configured to compute a nearness between a representative position representative of a user and a position of an object;
   a movement determination block configured to determine a movement of the object in a virtual space with an accuracy corresponding to the computed nearness;
   a drawing block configured to draw an image on the basis of the determined movement; and
   a real specified position acquisition block configured to acquire a real specified position indicated by the user in a real space as the position of the object;
   the representative position being a position of the user in the real space;
   the movement determination block determining the movement of the object by determining a movement of a virtual specified position that is a specified position in the virtual space with the accuracy corresponding to the nearness,
   wherein the movement determination block determines the movement of the virtual specified position such that, as the representative position is closer to the real specified position, a ratio of a distance between a virtual representative position representative of the user in the virtual space and the virtual specified position gets larger to a distance between the representative position and the real specified position.

2. The image processing apparatus according to claim 1, wherein
   the movement determination block determines a decision threshold in accordance with the nearness, detects an object in the virtual space which is smaller in distance than the determined decision threshold, and determines a movement of the detected object.

3. An image processing method comprising:
   computing a nearness between a representative position representative of a user and a position of an object;
   determining a movement of the object in a virtual space with an accuracy corresponding to the computed nearness;
   drawing an image on the basis of the determined movement;
   acquiring a real specified position indicated by the user in a real space as the position of the object,
   the representative position being a position of the user in the real space;
   determining the movement of the object by determining a movement of a virtual specified position that is a specified position in the virtual space with the accuracy corresponding to the nearness; and
   determining the movement of the virtual specified position such that, as the representative position is closer to the real specified position, a ratio of a distance between a virtual representative position representative of the user in the virtual space and the virtual specified position gets larger to a distance between the representative position and the real specified position.

4. A non-transitory computer-readable storage medium storing a program for a computer, comprising:
   by a nearness computation block, computing a nearness between a representative position representative of a user and a position of an object;
   by a movement determination block, determining a movement of the object in a virtual space with an accuracy corresponding to the computed nearness;
   by a drawing block, drawing an image on the basis of the determined movement; and
   by a real specified position acquisition block, acquiring a real specified position indicated by the user in a real space as the position of the object;

the representative position being a position of the user in the real space;

the movement determination block determining the movement of the object by determining a movement of a virtual specified position that is a specified position in the virtual space with the accuracy corresponding to the nearness, wherein the movement determination block determines the movement of the virtual specified position such that, as the representative position is closer to the real specified position, a ratio of a distance between a virtual representative position representative of the user in the virtual space and the virtual specified position gets larger to a distance between the representative position and the real specified position.

* * * * *